United States Patent [19]
Anzivino

[11] 3,930,722
[45] Jan. 6, 1976

[54] SANITARY WIG VIEWING DEVICE

[75] Inventor: Robert A. Anzivino, Somerset, N.J.

[73] Assignee: Omri M. Behr, Edison, N.J.

[22] Filed: May 13, 1974

[21] Appl. No.: 469,278

[52] U.S. Cl. .............. 350/296; 350/288; 272/8 M; 248/469; 35/58; D6/243; D6/245
[51] Int. Cl.² .............. G02B 5/10; A47G 1/14
[58] Field of Search .......... 350/288, 293, 295, 296, 350/298; 272/8 M, 8.5, 13; 248/469; 35/58; 223/66; D86/10 H, 10 A; D29/23 E; D6/243, 245

[56] References Cited
UNITED STATES PATENTS

| 936,344 | 10/1909 | Myers | 350/296 |
|---|---|---|---|
| 2,665,040 | 1/1954 | Reid | 35/58 |
| 2,899,860 | 8/1959 | Scott et al. | 35/58 |
| D52,639 | 11/1918 | Davis | D29/23 E |
| D190,789 | 6/1961 | Levis | D86/10 H |

FOREIGN PATENTS OR APPLICATIONS

| 168,120 | 8/1921 | United Kingdom | 35/58 |

*Primary Examiner*—Edward S. Bauer
*Assistant Examiner*—Jon W. Henry
*Attorney, Agent, or Firm*—Omri M. Behr

[57] ABSTRACT

There is provided a novel device whereby a prospective purchaser of wigs is enabled to determine the appearance of the wig on said purchaser's head without actually placing it thereon. The novel device comprises a concave mirror of predetermined focal length and a wig support means in combination therewith whereby the wig may be placed above and around said mirror and the prospective purchaser can view the reflection of her face in the mirror in such a manner that the wig accurately reflects the appearance of said wig on and about the purchaser's face.

2 Claims, 8 Drawing Figures

SANITARY WIG VIEWING DEVICE

BACKGROUND OF THE INVENTION

Wigs are traditionally displayed in stores selling the same on support means which usually but not essentially are shaped in the size and dimensions of a human head which may be a male or female representation. This displays the properties of the wig in a satisfactory manner but does not convey to the individual purchaser how the wig would look upon said purchaser's head. Hereinbelow female terminology will be utilized for the purchaser, however, it is contemplated that the device is equally applicable to male purchasers of wigs.

One obvious mode of determining the appearance of a wig upon the head of the prospective purchaser is for said purchaser to place the wig upon her head. Since wigs are direct body contact items of apparel many purchasers would object to wigs which have been worn albeit briefly by other persons because of fear of unsanitary conditions on the head of unknown previous wearers. One attempted solution to this problem has been to place a plane mirror in the face of a wig mannequin, that is to say, a head constructed of wood, plastic, cardboard, or similar material in the shape of a human head, suitably having a neck attached thereto as a support means. Utilizing such devices a wig to be purchased is placed on the mannequin and the purchaser views herself in the mirror to determine the appearance upon her head.

Although such devices do meet the sanitary part of the problem they are not satisfactory with respect to the "image" part of the problem. The reason for the unsatisfactory nature of the solution lies in the fact that in a plane mirror the image appears to be as far behind the reflective surface of the mirror as the reflected object, that is to say, the face, is in front of it. From a practical point of view, the prospective purchaser cannot sit with her face more than about 10 inches from the mirror since at closer distances the eye cannot take in a view of the major portion of the wig which can be viewed from the front. On the other hand, the purchaser cannot sit more than about 20 inches or an arm's length away from the device since certain adjustments to the lie of the fibers of the wig would always be made during the viewing process.

Unfortunately, at this distance from the mirror the difference between the angle subtended at the purchaser's eye of the outline of her face in the mirror is substantially less than it would be if the image of her face were at the plane of the mirror. The laws of optics offer no solution with respect to a plane mirror to this undesirable occurrence. The fact that the angle subtended is too small means that the wig is not viewed in proper proportion to the face and a correct judgement as to the appearance of the wig on the head of the prospective purchaser cannot be made. It would therefore be desirable to provide such a device wherein the angle subtended by the viewed image at the purchaser's eye is equal or substantially equal to the angle subtended by an image at the plane of the mirror (in this particular instance the term "plane of the mirror" should be considered generally as defining the place where a face would normally be under the wig).

It is well known in optics that a concave mirror wherein an object is place at a distance closer than the focus from the surface of said mirror will provide an upright and enlarged image, however this knowledge does not offer a readily theoretically calculable solution to the problem.

SUMMARY OF THE INVENTION

There is provided a novel, sanitary, wig viewing device comprising a concave mirror, the circumference thereof describing substantially an oval shape corresponding substantially to the elevational outline of a human face, and wig support means whereby a wig may be placed over and around said mirror whereby said mirror is framed by said wig in the same manner as a face substantially in the position of said mirror would be framed. The focal length of said mirror will lie between about 15 and about 30 inches, that is to say, that the radius of curvature of said mirror will be about 30 to about 60 inches.

DESCRIPTION OF THE PREFERRED EMBODIMENTS

The present invention comprises a concave mirror 11 having a focal length of between about 15 and about 30 inches, a wig support means 12 for holding a wig suitable for use on a human head in such a manner that the aforesaid mirror 11 is framed by the wig 116 so that the fibers or hair of said wig fall around said mirror in the same manner as they would if they were placed upon a head. And, optionally, a support means 14 for adjusting the height of mirror 11.

Figure 1:
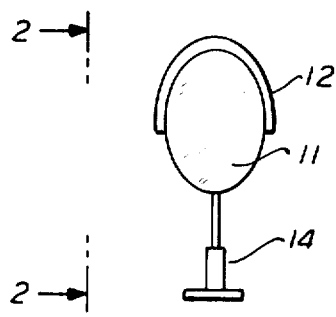
FIG. 1 shows a front elevational view of a simple modification of the present invention.
Figure 2:
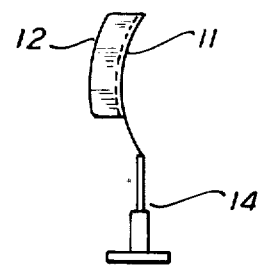
FIG. 2 shows a side elevational view of the device of FIG. 1 viewed from viewing line 2—2.
Figure 3:
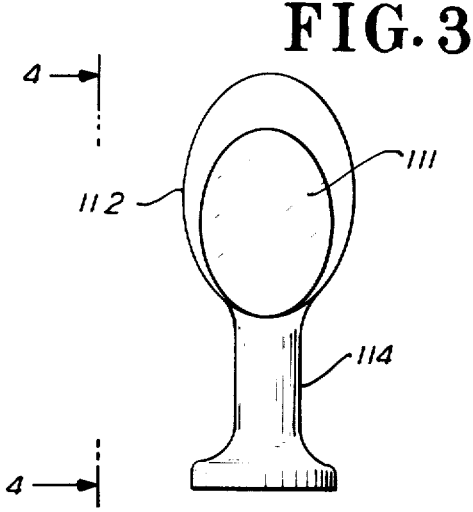
FIG. 3 shows a front elevational view of a preferred embodiment of the invention.
Figure 4:
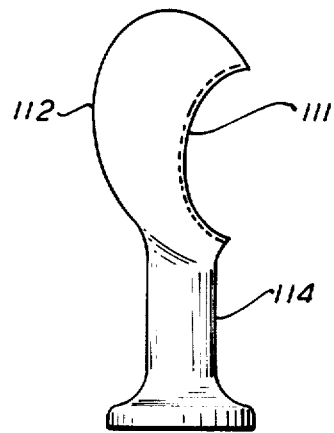
FIG. 4 shows the side elevational view of FIG. 3 viewed at 4—4.
Figure 5:
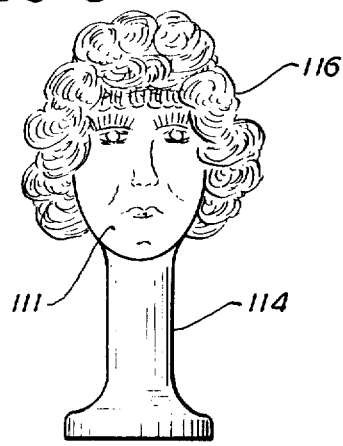
FIG. 5 shows the device of FIG. 3 with a wig placed thereon viewed by a prospective purchaser.
Figure 6:
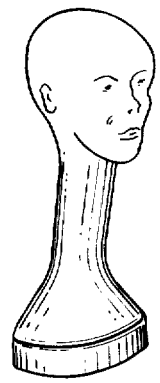
FIG. 6 is a perspective view of a wig mannequin of the prior art.

Since it is desirable that the mirror 11 reflect the face of a viewer as close to the actual size of said viewer as possible without showing background or cutting off portions of the face, the mirror is cut so as to provide a substantially oval circumference. The shape of the upper portion of the mirror, that is to say, that portion of the mirror which would reflect the upper portion of a human forehead, is rather unimportant since most wigs would cover that portion. Any combination of a concave mirror of the focal length given herein and a means for placing a wig around it substantially in the manner shown in FIG. 5 is to be considered within the scope of the present invention. Nevertheless, it is preferred to utilize a conventional wig mannequin as the support means. Said conventional wig mannequins are shaped in the form of a human head and neck. The neck thereof often being somewhat elongated which will stand by itself upon any flat surface. The portion of said mannequin 112 has deleted therefrom the frontal portion comprising the protrusions and cavities corresponding to the eyes, the nose, and the mouth and a concave mirror 111 located therein to provide the required reflective surface.

Figure 8:
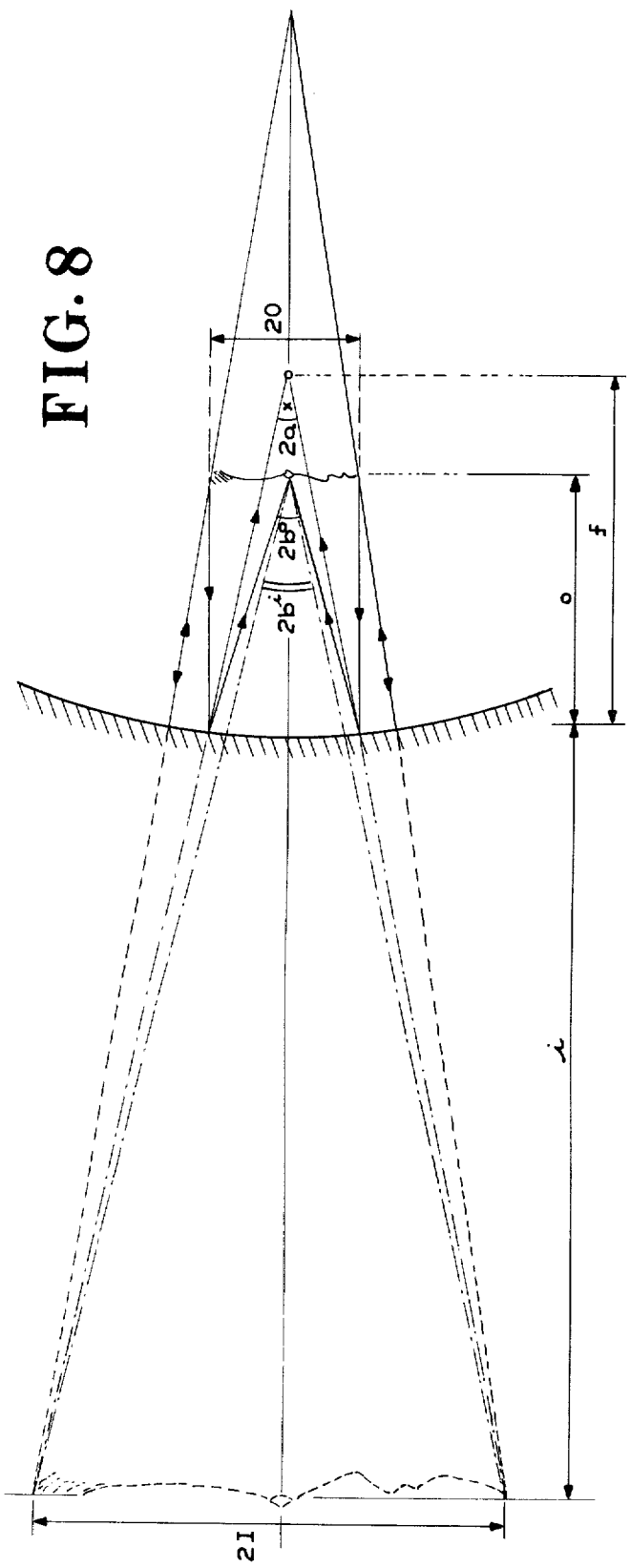
FIG. 8 is a ray diagram of a reflexion in a concave mirror within the scope of the present invention.
Figure 7:
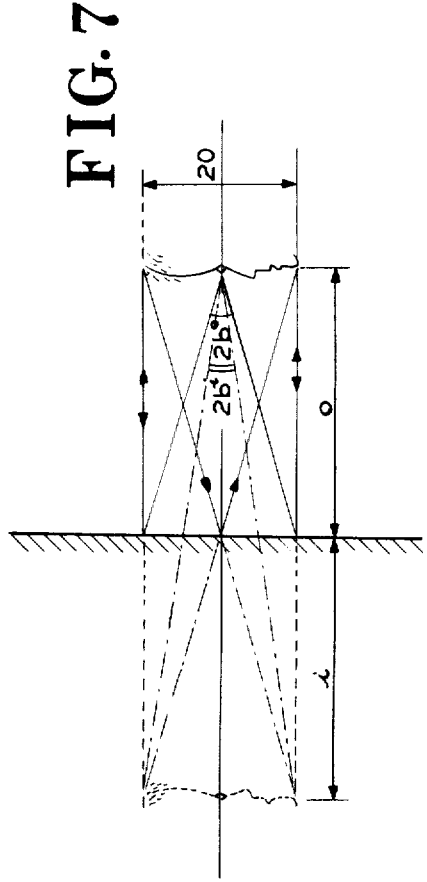
FIG. 7 is a ray diagram of a reflexion in a plane mirror.

As is shown in FIGS. 7 and 8, the angle subtended at the eye by a theoretical image at the plane of the mirror is $2h^o$ and the angle subtended at the eye by the virtual image is $2h^i$.

Since:
$O$ is half the height of the head;
$o$ is the distance of the face from the mirror.
$I$ is half the height of the image;
$i$ is the distance of the image from the mirror.
$f$ is the focal length.
$a$ is the angle subtended at the focus of a concave mirror of a theoretical image of height O at the plane of the mirror.

Since $1/o + 1/i = 1/f$
$i = 1/(1/f - 1/o)$

As will be seen from FIG. 8:
Tan $a = I/(i^* + f) = O/f$

Therefore, $$I = \frac{O}{f}(i+f)$$

$$= \frac{O}{f}\left(\frac{1}{(1/f - 1/o)^*} + f\right)$$

As will be seen from FIG. 8:
Tan $h^i = I/i + o$ $$= \frac{\frac{O}{f}\left(\frac{1}{(1/f - 1/o)^*} + f\right)}{\frac{1}{(1/f - 1/o)^*} + o}$$

(*) If $i$ is negative (virtual image) treat as positive.

Similarly:
Tan $h^o$ is $O/o$.

Thus, since $f$, $O$ and $o$ are given, $h^o$ and $h^i$ may be calculated and the discrepancy ratio $(h^o - h^i)/h^o$ may be calculated.

In both FIG. 7 and FIG. 8, it is assumed that the eyes are positioned halfway up a head 8 inches in height with the front of the face 10 to 20 inches from the mirror.

It will be seen that the ratio $(h^o - h^i)/h^o$ (where $h^o$ and $h^i$ are in radians) is approximately 48 percent.

This ratio is entirely unacceptable in practice.

It is our surprising finding that in concave mirrors of focal length 15 to 30 inches, the discrepancy ratio cannot exceed 38 percent. This however is in the most unfavorable condition (focal length: 30 inches, face to mirror distance: 10 inches) and is not a practical measure. On the other hand, in the substantially most favored position (focal length: 20 inches, face to mirror distance: 18 inches), the discrepancy ratio is only about 8 percent.

It will be readily seen from the foregoing calculations that the deviation decreases substantially as the object is moved back towards the focus. The improvement is however limited by image distortion which occurs when the object is moved very close to the focus.

EXAMPLE I

FIG. 7 shows a reflexion in a plane mirror. The height of the object is 8 inches and the distance from the mirror is 14 inches. The eye is arbitrarily considered to be in the center of the head/object shown. In actual life, this is not strictly accurate but for purposes of illustration of the invention the deviation is not significant.

The angle subtended by a theoretical image at the mirror is $2h^o$, where tan $h = 4/14 = 0.2857$. Therefore, $h^o = 15.95^o = 0.278$ rads.

The angle subtended by the image at the eye is $2h^i$. Where tan $h^i = 4/28 = 0.1429$, Therefore, $h^i = 8.1^o = 0.142$ rads. Deviation = 0.136 rads. % deviation = 48.9 percent.

EXAMPLE II

FIG. 8 shows a reflexion in a mirror within the scope of this invention.

The situation shown is merely illustrative and is intended to show an operative condition rather than an optimum or limiting condition.

$f$ (focal length): 20 inches
$o$ (object to mirror): 14 inches
Since
$1/o + 1/i = 1/f$.
$0.07143 + 1/i = 0.05$
Therefore
$-1/i = 0.02143$
$-i = 46.66$ Height of object = $2O$ = 8 inches
Height of image = $2I$
Since
Tan $a = I/(i+f)$
and
Tan $a = O/f = 4/20 = 0.2$
Therefore, $I = 0.2$ $(i+f) = 0.2 \times 66.66 = 13.332$ inches
$h^o$ and $h^i$ are as defined hereinabove
tan $h^i = I/(i+o) = 13.332/(46.66 + 14) = 13.332/60.66 = 0.2198$
Therefore, $h^i = 12.4^o = 0.216$ rads. Since $h^o = 15.95^o = 0.278$ rads. deviation = 0.062 = 22.3 percent

I claim:
1. A sanitary wig viewing means comprising:
a substantially oval, concave mirror having a focal length in the range of fifteen to thirty inches and having dimensions substantially those of the outline of the frontal elevation of a human face below the normal hair line of said face; and,
means for mounting a wig peripherally around at least the upper half of the circumference of said mirror.

2. A sanitary wig viewing means comprising:
a rigid, self-supporting stand adapted to support a wig, said stand having the size and mutual dimensions of a human head rearwardly of that portion of the head comprising the forehead, the nose, the eyes, the mouth, and the chin; and,
a substantially oval, concave mirror having a focal length in the range of fifteen to thirty inches, said mirror being located in the front portion of said support means and having dimensions substantially equivalent to the frontal elevation presented by said human head,
wherein when a wig is in position on the wig viewing means, a human head will appear in substantially the correct proportions with respect to said wig when viewed from within arms distance of the wig viewing means.

* * * * *